US008014935B2

(12) United States Patent
Moriya et al.

(10) Patent No.: US 8,014,935 B2
(45) Date of Patent: Sep. 6, 2011

(54) CONTROL DEVICE FOR INTERNAL COMBUSTION ENGINE

(75) Inventors: Hidenori Moriya, Susono (JP); Ryo Tadokoro, Okegawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 269 days.

(21) Appl. No.: 12/521,640

(22) PCT Filed: Dec. 27, 2007

(86) PCT No.: PCT/JP2007/075408
§ 371 (c)(1),
(2), (4) Date: Jun. 29, 2009

(87) PCT Pub. No.: WO2008/081992
PCT Pub. Date: Jul. 10, 2008

(65) Prior Publication Data
US 2010/0318280 A1 Dec. 16, 2010

(30) Foreign Application Priority Data
Dec. 28, 2006 (JP) ................................. 2006-355719

(51) Int. Cl.
F02D 41/00 (2006.01)
F01L 1/34 (2006.01)
(52) U.S. Cl. ................ 701/114; 123/90.15; 123/406.45; 701/103; 73/114.79; 702/183

(58) Field of Classification Search .......... 701/101–105, 701/107, 110, 111, 114; 123/90.11, 90.12, 123/90.15–90.18, 90.23, 90.25, 90.31, 406.13, 123/406.45; 702/44, 182, 183, 185; 73/114.02, 73/114.03, 114.16, 114.27, 114.31, 114.37, 73/114.79, 115.02
See application file for complete search history.

(56) References Cited

U.S. PATENT DOCUMENTS

| 4,683,861 | A * | 8/1987 | Breitkreuz et al. ........... 123/698 |
| 7,121,260 | B2 * | 10/2006 | Miyanoo et al. ......... 123/406.26 |
| 7,182,066 | B2 * | 2/2007 | Goya et al. ..................... 123/435 |
| 7,380,540 | B1 * | 6/2008 | Duffy et al. ................... 123/435 |
| 7,469,181 | B2 * | 12/2008 | Duffy et al. ................... 701/108 |
| 7,693,646 | B2 * | 4/2010 | Moriya ........................ 701/111 |
| 7,870,844 | B2 * | 1/2011 | Moriya et al. ........... 123/406.45 |
| 2010/0269801 | A1 * | 10/2010 | Kitamura et al. ........ 123/568.14 |

FOREIGN PATENT DOCUMENTS
JP 6 317116 11/1994
(Continued)

Primary Examiner — John T Kwon
Assistant Examiner — Johnny H Hoang
(74) Attorney, Agent, or Firm — Oblon, Spivak, McClelland, Maier & Neustadt, L.L.P.

(57) ABSTRACT

In this apparatus, maintaining control (time t1 to t2) which instructs fixing of the open timing VVT of an intake valve is executed in a predetermined low load state. Subsequently, there are executed changing control which instructs changing of the open timing VVT by a predetermined amount (time t2), and maintaining control which again instructs fixing of the open timing VVT of the intake valve (time t2 to t3). An intake-valve control apparatus is determined to be "anomalous" when an change amount $\Delta$ave ($=$ave2$-$ave1) between the average ave1 of a large number of sample values of $\Delta$MFB$\beta$ (combustion percentage increase amount within a predetermined crank angle range in an expansion stroke) during the maintaining control before execution of the changing control and the average ave2 of a large number of sample values of $\Delta$MFB$\beta$ during the maintaining control after execution of the changing control is less than a predetermined value C.

19 Claims, 8 Drawing Sheets

CONTROL DEVICE FOR INTERNAL COMBUSTION ENGINE

TECHNICAL FIELD

The present invention relates to a control apparatus for an internal combustion engine including an intake-valve control apparatus for controlling at least open timing of intake valves and, more particularly, to detection of a failure of the control apparatus for an internal combustion engine (the intake-valve control apparatus).

BACKGROUND ART

Conventionally, there has been widely known an internal combustion engine equipped with an intake-valve control apparatus capable of controlling open and close timings (and the maximum lift amount) of the intake valves (see, for example, Japanese Patent Application Laid-Open (kokai) No. H6-317116). As is known, when the open and close timings of the intake valves are advanced, a period during which both the intake valves and the exhaust valves are maintained in an opened state (hereinafter referred to as an "overlap period") is prolonged, whereby the efficiency of charging air into each combustion chamber can be increased by making use of the inertia of intake air when the engine is operated at high speed and/or under heavy load. When the efficiency of charging air into each combustion chamber increases, the cylinder pressure (combustion pressure) during the expansion stroke increases. Accordingly, when the engine is operated at high speed and/or under heavy load, as a result of advancing the open and close timings of the intake valves, the cylinder pressure during the expansion stroke becomes higher as compared with the case where the open and close timings of the intake valves are not advanced.

In the apparatus described in this document, a failure of the intake-valve control apparatus is detected on the basis of the above-described phenomenon. Specifically, when the engine is operated at high speed and/or under heavy load, there is calculated a difference between an average effective cylinder pressure during a period in which advancement of open and close timings of the intake valves is instructed and that during a period in which advancement of open and close timings of the intake valves is not instructed. When the difference is less than a predetermined judgment value, the open and close timings of the intake valves are determined not to have been changed as instructed, whereby a failure of the intake-valve control apparatus is detected.

However, as described above, only when the engine is operated at high speed and/or under heavy load, a clear difference is produced in cylinder pressure during the expansion stroke between the case where the open and close timings of the intake valves are advanced and the case where the open and close timings of the intake valves are not advanced. Accordingly, the apparatus described in the above-mentioned document has a problem in that a failure of the intake-valve control apparatus cannot be detected correctly in operation states other than the state where the engine is operated at high speed and/or under heavy load.

Further, the cylinder pressure during the expansion stroke may change stemming from various factors other than the overlap period. Therefore, the apparatus described in the above-mentioned document may fail to detect a failure of the intake-valve control apparatus correctly even when the engine is operated at high speed and/or under heavy load.

Therefore, there has been desire for an apparatus which can detect a failure of the intake-valve control apparatus more accurately.

DISCLOSURE OF THE INVENTION

Accordingly, an object of the present invention is to provide a control apparatus for an internal combustion engine which includes an intake-valve control apparatus for controlling at least open timing of intake valves and which can accurately detect a failure of the intake-valve control apparatus.

A control apparatus for an internal combustion engine (hereinafter may be called an engine control apparatus) according to the present invention comprises an intake-valve control apparatus, combustion percentage acquisition means, and failure detection means. Hereinbelow, these structural components will be described one by one.

The intake-valve control apparatus (intake-valve valve-timing changing mechanism) controls at least open timing of an intake valve. This intake-valve control apparatus may be configured to control close timing of the intake valve and the maximum lift amount of the intake valve, as well as the open timing of the intake valve.

The combustion percentage acquisition means acquires a change in combustion percentage with crank angle (in an expansion stroke), the combustion percentage being the ratio of an amount of combusted fuel, which increases continuously during the expansion stroke, to a total amount of fuel taken into a combustion chamber of the internal combustion engine in an intake stroke. The change in combustion percentage with crank angle can be acquired by a known method making use of, for example, a change in cylinder pressure during the expansion stroke.

The failure detection means detects a failure of the engine control apparatus (particularly, a failure of the intake-valve control apparatus) by making use of an increase amount of the combustion percentage within a predetermined crank angle range during the expansion stroke, the increase amount changing as a result of control of the open timing of the intake valve by the intake-valve control apparatus. The principle of detection of a failure of the intake-valve control apparatus by the failure detection means will next be described.

In general, when the overlap period is prolonged by means of advancing the open timing of the intake valve, the amount of combusted gas which returns from the exhaust passage to the combustion chamber (that is, the amount of combusted gas remaining within the combustion chamber; hereinafter referred to as the "residual combusted gas amount") increases. That is, the greater the amount by which the open timing of the intake valve is advanced, the greater the amount of residual combusted gas. Meanwhile, the greater the amount of residual combusted gas, the smaller the combustion speed of a gas-fuel mixture during the expansion stroke (accordingly, the smaller the increase gradient of the above-mentioned combustion percentage), because of the increased degree of instability of combustion of the gas-fuel mixture, among other factors.

In other words, the increase amount of the combustion percentage within the predetermined crank angle range during the expansion stroke (hereinafter may be simply called the "combustion percentage increase amount") strongly depends on the amount of residual combusted gas (accordingly, the open timing of the intake valve), and the greater the amount by which the open timing of the intake valve is advanced, the smaller the combustion percentage increase amount. Therefore, when the combustion percentage increase amount is utilized, an accurate determination can be made as to whether or not the open timing of the intake valve is controlled as intended; i.e., a failure of the intake-valve control apparatus can be accurately detected. The above-described configuration is based on such knowledge.

In this case, preferably, the failure detection means is configured to detect a failure of the engine control apparatus (particularly, a failure of the intake-valve control apparatus) by causing the intake-valve control apparatus to execute changing control for changing the open timing of the intake valve by a predetermined amount, and making use of an amount of change between the combustion percentage increase amount before execution of the changing control and that after execution of the changing control. Specifically, in this case, when the amount of change in the combustion percentage increase amount is less than a predetermined value, the engine control apparatus is determined to have a failure.

Here, there will be considered the case where the intake-valve control apparatus is caused to execute the changing control for changing the open timing of the intake valve by the predetermined amount. In this case, if the open timing of the intake valve is actually changed by the predetermined amount (that is, if the intake-valve control apparatus is normal), the amount of change between the combustion percentage increase amount before execution of the changing control and that after execution of the changing control becomes a certain value corresponding to the above-described predetermined value. Meanwhile, if in actuality the open timing of the intake valve is not changed by the predetermined amount (that is, if the intake-valve control apparatus is anomalous), the amount of change between the combustion percentage increase amount before execution of the changing control and that after execution of the changing control becomes smaller than the certain value.

The above-described configuration is based on such knowledge. By virtue of the above-described feature, a failure of the engine control apparatus can be detected accurately by means of a simple configuration.

Further, the failure detection means may be configured to detect a failure of the engine control apparatus (particularly, a failure of the intake-valve control apparatus) by causing the intake-valve control apparatus to execute maintaining control for maintaining constant the open timing of the intake valve, and making use of the degree of a change in the combustion percentage increase amount during execution of the maintaining control. Specifically, in this case, when the degree of the change in the combustion percentage increase amount during execution of the maintaining control is greater than a predetermined degree, the engine control apparatus is determined to have a failure.

Here, there will be considered the case where the intake-valve control apparatus is caused to execute the maintaining control for maintaining constant the open timing of the intake valve. In this case, if the open timing of the intake valve is actually maintained constant (that is, if the intake-valve control apparatus is normal), the degree of the change in the combustion percentage increase amount during execution of the maintaining control is small. Meanwhile, if in actuality the open timing of the intake valve is not maintained constant (that is, if the intake-valve control apparatus is anomalous), the amount of the change in the combustion percentage increase amount during execution of the maintaining control becomes larger.

The above-described configuration is based on such knowledge. By virtue of the above-described feature, a failure of the engine control apparatus can be detected accurately by means of a simple configuration.

In the case where the above-described control apparatus according to the present invention comprises intake-valve control means for performing combustion-percentage-increase-amount control which causes the intake-valve control apparatus to control the open timing of the intake valve such that the combustion percentage increase amount coincides with an increase amount target value, the failure detection means may be configured to determine that a failure of the engine control apparatus (particularly, a failure of the intake-valve control apparatus) has occurred when the degree of a deviation of the combustion percentage increase amount from the increase amount target value is greater than a predetermined degree during the combustion-percentage-increase-amount control.

The "increase amount target value" may be a fixed value or a value corresponding to operating conditions (e.g., engine speed, cylinder intake air amount, load, etc.). Further, the combustion-percentage-increase-amount control is achieved through performance of, for example, control (feedback control) such that, when the combustion percentage increase amount is less than the increase amount target value, the open timing of the intake valve is delayed (that is, the overlap period is shortened), and when the combustion percentage increase amount is greater than the increase amount target value, the open timing of the intake valve is advanced (that is, the overlap period is prolonged).

There will be considered the case where the combustion-percentage-increase-amount control is usually performed. In this case, if the intake-valve control apparatus is normal, the degree of the deviation of the combustion percentage increase amount from the increase amount target value is small, because the combustion percentage increase amount can be adjusted such that the combustion percentage increase amount accurately coincides with the increase amount target value. Meanwhile, if the intake-valve control apparatus is anomalous, the degree of deviation of the combustion percentage increase amount from the increase amount target value becomes large, because the combustion percentage increase amount cannot be adjusted such that the combustion percentage increase amount accurately coincides with the increase amount target value.

The above-described configuration is based on such knowledge. In the case where the above-mentioned combustion-percentage-increase-amount control is performed, the above-described feature also enables accurate detection of a failure of the intake-valve control apparatus by use of a simple configuration. In addition, the above-described configuration enables detection of a failure of the engine control apparatus during the combustion-percentage-increase-amount control. Accordingly, it is unnecessary to change the details (manner) of control of the opening timing of the intake valve for detection of a failure of the engine control apparatus.

In the above-described control apparatus according to the present invention, when the intake-valve control means for performing the combustion-percentage-increase-amount control is provided, the failure detection means may be configured to detect a failure of the engine control apparatus (particularly, a failure of the intake-valve control apparatus) by making use of a change amount between the combustion percentage increase amount before the increase amount target value is changed by a predetermined amount during the combustion-percentage-increase-amount control and that after the increase amount target value has been changed by the predetermined amount during the combustion-percentage-increase-amount control. Specifically, in this case, when the change amount of the combustion percentage increase amount is less than a predetermined value, the engine control apparatus is determined to have a failure.

Here, there will be considered the case where the increase amount target value is changed by a predetermined amount during the combustion-percentage-increase-amount control, which is performed usually. In this case, if the intake-valve control apparatus is normal, the change amount between the combustion percentage increase amount before the increase amount target value is changed and that after the increase amount target value has been changed becomes (substantially) equal to the above-mentioned predetermined value. Meanwhile, if the intake-valve control apparatus is anomalous, the change amount between the combustion percentage increase amount before the increase amount target value is changed and that after the increase amount target value has been changed becomes smaller than the above-mentioned predetermined value.

The above-described configuration is based on such knowledge. In the case where the above-mentioned combustion-percentage-increase-amount control is performed and the increase amount target value is changed in accordance with the operation state, the above-described feature also enables a failure of the engine control apparatus to be detected accurately by use of a simple configuration. In addition, the above-described configuration enables detection of a failure of the engine control apparatus during the combustion-percentage-increase-amount control. Accordingly, it is unnecessary to change the details (manner) of control of the opening timing of the intake valve for detection of a failure of the engine control apparatus.

In the case where the above-described control apparatus according to the present invention comprises intake-valve control means for performing open timing control which causes the intake-valve control apparatus to control the open timing of the intake valve such that the open timing of the intake valve coincides with an open timing target value, preferably, the intake-valve control means is configured such that, when the failure detection means has determined that a failure of the intake-valve control apparatus, which is a failure of the engine control apparatus, had occurred, the intake-valve control means performs, in place of the open timing control, combustion-percentage-increase-amount control which causes the intake-valve control apparatus to control the open timing of the intake valve such that the combustion percentage increase amount coincides with an increase amount target value.

The "open timing target value" may be a fixed value or a value corresponding to operating conditions (e.g., engine speed, cylinder intake air amount, load, etc.). Further, the open timing control is achieved through performance of, for example, control (feedback control) such that the detection value of the open timing of the intake valve obtained from an output value of a sensor (a cam rotational angle sensor) which detects the open timing of the intake valve coincides with the open timing target value.

There will be considered the case where the failure detection means determines that a failure has occurred in the intake-valve control apparatus, while the open timing control is being performed as a usual control, and the cause of the failure of the intake-valve control apparatus is a failure of the above-mentioned cam rotational angle sensor, a drop in pressure of oil used for changing the open timing of the intake valve, or the like. In such a case, continuation of the control (that is, the above-described open timing control which renders the open timing of the intake valve coincident with the target value becomes difficult. However, in many case, changing the open timing of the intake valve (accordingly, adjusting the combustion percentage increase amount) is still possible.

The above-described configuration is based on such knowledge. By virtue of the above-described feature, when a failure of the intake-valve control apparatus, such as a failure of the above-mentioned cam rotational angle sensor or a drop in pressure of oil used for changing the open timing of the intake valve, occurs in a state where the open timing control is being performed as an usual operation, the combustion-percentage-increase-amount control, which can be executed, is performed in place of the open timing control, which cannot be continued.

There will be considered the case where the above-described control apparatus according to the present invention comprises, in addition to the intake-valve control apparatus, an exhaust-valve control apparatus (an exhaust-valve valve timing changing mechanism) for controlling at least close timing of an exhaust valve of the engine; the above-described open timing control is performed so as to cause the intake-valve control apparatus to control the open timing of the intake valve such that the open timing of the intake valve coincides with the open timing target value; and close timing control is performed so as to cause the exhaust-valve control apparatus to control the close timing of the exhaust valve such that the close timing of the exhaust valve coincides with a close timing target value.

In this case, control of the overlap period (that is, control of the combustion percentage increase amount) can be properly executed when both the open timing control for the intake valve and the close timing control for the exhaust valve are executed normally. Accordingly, the above-described failure detection means may be configured to detect a failure of the intake-valve control apparatus and a failure of the exhaust-valve control apparatus, as failures of the engine control apparatus, by making use of the combustion percentage increase amount, which changes due to control of the open timing of the intake valve performed by the intake-valve control apparatus and control of the close timing of the exhaust valve performed by the exhaust-valve control apparatus.

In such a configuration, preferably, the exhaust-valve control means is configured such that, when the failure detection means has determined that a failure of the intake-valve control apparatus had occurred, the exhaust-valve control means performs, in place of the close timing control, combustion-percentage-increase-amount control which causes the exhaust-valve control apparatus to control the close timing of the exhaust valve such that the combustion percentage increase amount coincides with an increase amount target value. In this case, preferably, the intake-valve control means stops the open timing control.

When only a failure of the intake-valve control apparatus is detected (i.e., a failure of the exhaust-valve control apparatus is not detected), the overlap period cannot be properly controlled even if the above-mentioned close timing control for the exhaust valve is continued by the exhaust-valve control apparatus whose failure is not detected, because the open timing control for the intake valve is difficult to be continued. However, the combustion percentage increase amount can still be adjusted by changing the close timing of the exhaust valve by making use of the exhaust-valve control apparatus. The above-described configuration is based on such knowledge. By virtue of the above-described feature, when only a failure of the intake-valve control apparatus is detected, after that point in time, the combustion-percentage-increase-amount control is executed by making use of the exhaust-valve control apparatus. As a result, operation of the internal combustion engine can be continued stably.

Similarly, preferably, the intake-valve control means is configured such that, when the failure detection means has determined that a failure of the exhaust-valve control apparatus had occurred, the intake-valve control means performs, in place of the open timing control, combustion-percentage-increase-amount control which causes the intake-valve control apparatus to control the open timing of the intake valve such that the combustion percentage increase amount coincides with the increase amount target value. In this case, preferably, the exhaust-valve control means stops the close timing control.

When only a failure of the exhaust-valve control apparatus is detected (i.e., a failure of the intake-valve control apparatus is not detected), the overlap period cannot be properly controlled even if the above-mentioned open timing control for the intake valve is continued by the intake-valve control apparatus whose failure is not detected, because the close timing control for the exhaust valve is difficult to be continued. However, the combustion percentage increase amount can still be adjusted by changing the open timing of the intake valve by making use of the intake-valve control apparatus. The above-described structure is based on such knowledge. By virtue of the above-described feature, when only a failure of the exhaust-valve control apparatus is detected, after that point in time, the combustion-percentage-increase-amount control is executed by making use of the intake-valve control apparatus. As a result, operation of the internal combustion engine can be continued stably.

In the above-described control apparatus of the present invention, preferably, the failure detection means is configured to detect the failure when the internal combustion engine is in a light load state in which the load of the internal combustion engine is lighter than a predetermined level. In the above-mentioned light load state, since the pressure within the intake passage is low, the above-mentioned residual combusted gas amount is large. There is a trend that the grater the residual combusted gas amount, the greater the amount of a change in the residual combusted gas amount with a change in the overlap period.

This means that, in the above-mentioned light load state, the amount of a change in the combustion percentage increase amount with a change in the overlap period is large. Accordingly, when the failure detection means, which detects a failure of the intake-valve control apparatus (and the exhaust-valve control apparatus) by making use of the combustion percentage increase amount, which changes with a change in the overlap period, detects a failure in the above-mentioned light load state, its detection accuracy increases. The above-described configuration is based on such knowledge. By virtue of the above-described feature, a failure of the intake-valve control apparatus (and the exhaust-valve control apparatus) can be detected with enhanced accuracy.

Further, in the case where the above-described control apparatus according to the present invention comprises ignition timing control means for performing ignition timing control which controls the timing of ignition effected by an ignition apparatus such that the combustion percentage at a predetermined crank angle during the expansion stroke coincides with a combustion percentage target value, the failure detection means may be configured to acquire the combustion percentage increase amount on the basis of a deviation of the combustion percentage at the predetermined crank angle during the ignition timing control from the combustion percentage target value.

The "combustion percentage target value" may be a fixed value or a value corresponding to operating conditions (e.g., engine speed, cylinder intake air amount, load, etc.). Further, the ignition timing control is achieved through performance of, for example, control (feedback control) which advances the ignition timing when the combustion percentage at the predetermined crank angle is less than the combustion percentage target value, and delays the ignition timing when the combustion percentage at the predetermined crank angle is greater than the combustion percentage target value.

BEST MODE FOR CARRYING OUT THE INVENTION

An embodiment of a control apparatus for an internal combustion engine according to the present invention will be described with reference to the drawings.

Figure 1:
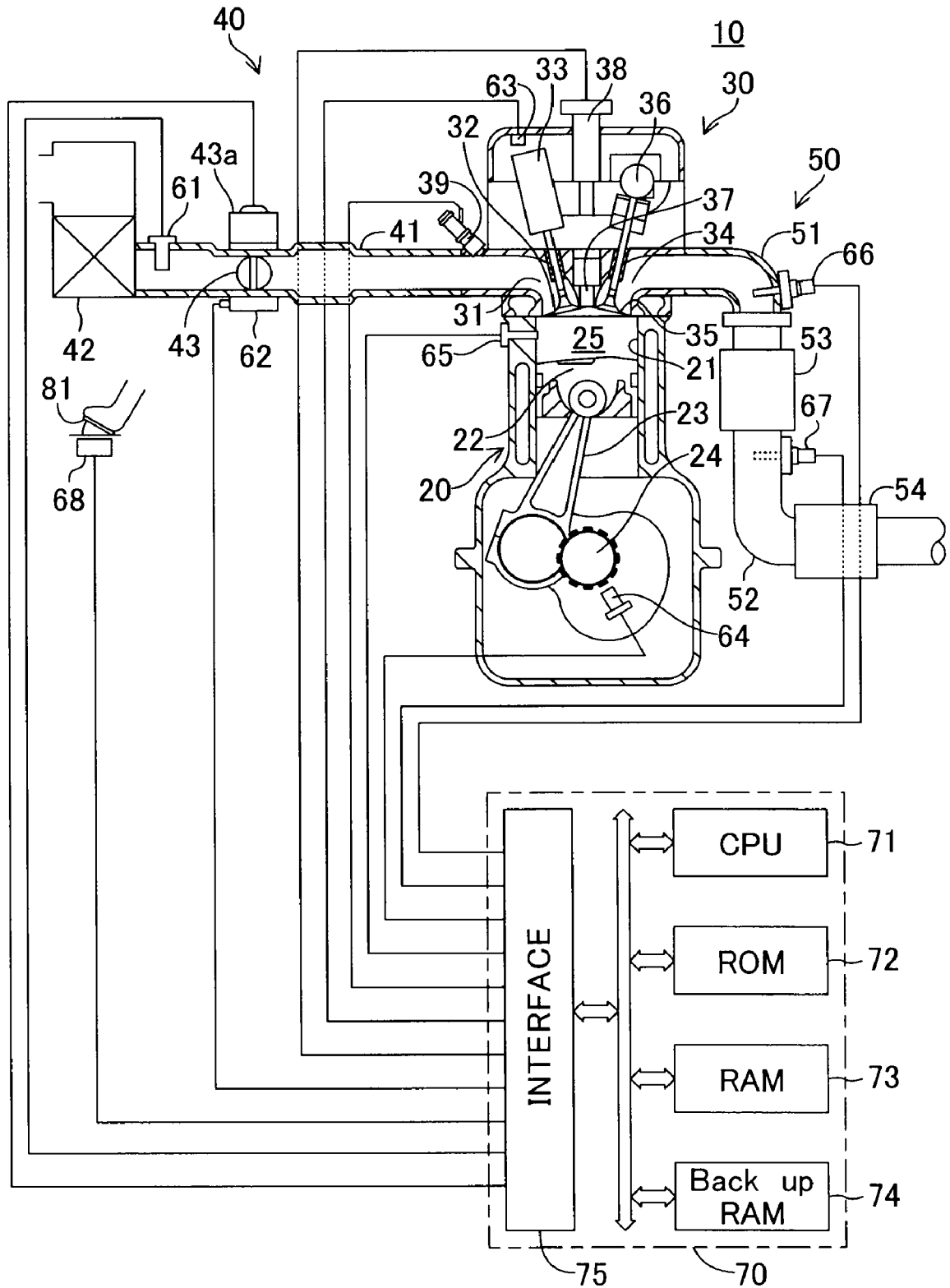
FIG. 1 is a schematic diagram of an internal combustion engine to which a control apparatus according to an embodiment of the present invention is applied.

FIG. 1 schematically shows the configuration of a system configured such that a control apparatus according to an embodiment of the present invention is applied to a spark-ignition multi-cylinder (4-cylinder) four-cycle internal combustion engine 10. This internal combustion engine 10 includes a cylinder block section 20 including a cylinder block, a cylinder block lower-case, an oil pan, etc.; a cylinder head section 30 fixed on the cylinder block section 20; an intake system 40 for supplying gasoline gas mixture to the cylinder block section 20; and an exhaust system 50 for discharging exhaust gas from the cylinder block section 20 to the exterior of the engine.

The cylinder block section 20 includes cylinders 21, pistons 22, connecting rods 23, and a crankshaft 24. Each of the pistons 22 reciprocates within the corresponding cylinder 21. The reciprocating motion of the piston 22 is transmitted to the crankshaft 24 via the respective connecting rod 23, whereby the crankshaft 24 is rotated. The cylinder 21 and the head of the piston 22 form a combustion chamber 25 in cooperation with the cylinder head section 30.

The cylinder head section 30 includes an intake port 31 communicating with the combustion chamber 25; an intake valve 32 for opening and closing the intake port 31; an intake-valve control apparatus 33 for driving the intake valve 32 so as to open and close the intake port; an exhaust port 34 communicating with the combustion chamber 25; an exhaust valve 35 for opening and closing the exhaust port 34; an exhaust cam shaft 36 for driving the exhaust valve 35; a spark plug 37; an igniter 38 including an ignition coil for generating a high voltage to be applied to the spark plug 37; and an injector (fuel injection means) 39 for injecting fuel into the intake port 31.

The intake-valve control apparatus 33 has a known structure for adjusting and controlling a relative rotational angle (phase angle) between an intake cam shaft and an intake cam (not shown). Therefore, the intake-valve control apparatus 33 can adjust open timing VVT (open and close timings) of the intake valve 32. Thus, the above-described overlap period can be adjusted.

The intake system 40 includes an intake pipe 41 which includes an intake manifold communicating with the intake port 31 and forming an intake passage in cooperation with the intake port 31; an air filter 42 provided at an end portion of the intake pipe 41; a throttle valve 43 provided within the intake pipe 41 and adapted to change the opening cross sectional area of the intake passage; and a throttle valve actuator (throttle valve drive means) 43a composed of a DC motor.

The exhaust system 50 includes an exhaust manifold 51 communicating with the exhaust port 34; an exhaust pipe 52 connected to the exhaust manifold 51; an upstream three-way catalyst 53 disposed (interposed) in the exhaust pipe 52; and a downstream three-way catalyst 54 disposed (interposed) in the exhaust pipe 52 to be located downstream of the first catalyst 53. The exhaust port 34, the exhaust manifold 51, and the exhaust pipe 52 constitute an exhaust passage.

Meanwhile, this system includes a hot-wire air flowmeter 61; a throttle position sensor 62; an intake-cam rotational angle sensor 63; a crank position sensor 64; a cylinder pressure sensor 65; an air-fuel ratio sensor 66 disposed in the exhaust passage to be located upstream of the first catalyst 53; an air-fuel ratio sensor 67 disposed in the exhaust passage to be located downstream of the first catalyst 53 and upstream of the second catalyst 54; and an accelerator opening sensor 68.

The hot-wire air flowmeter 61 detects the mass flow rate (per unit time) of intake air flowing through the intake pipe 41, and outputs a signal representing the detected mass flow rate Ga. The throttle position sensor 62 detects the opening of the throttle valve 43, and outputs a signal representing the detected throttle valve opening TA. The intake-cam rotational angle sensor 63 detects the rotational angle of the intake cam, and outputs a signal representing open timing VVT of the intake valve 32. The crank position sensor 64 detects the rotational angle of the crank shaft 24, and outputs a signal representing engine rotational speed NE. The cylinder pressure sensor 65 detects pressure within the combustion chamber 25, and outputs a signal representing the detected cylinder pressure Pc.

The upstream air-fuel ratio sensor 66 and the downstream air-fuel ratio sensor 67 respectively detect the air-fuel ratio on the upstream side of the first catalyst 53 and that on the downstream side of the first catalyst 53, and output respective signals respectively representing the air-fuel ratio measured on the upstream side of the first catalyst 53 and the air-fuel ratio measured on the downstream side of the first catalyst 53.

The accelerator opening sensor 68 detects an operation amount of an accelerator pedal 81 operated by a driver, and outputs a signal representing the detected operation amount Accp of the accelerator pedal 81.

An electric controller 70 is a microcomputer, which includes the following mutually bus-connected elements: a CPU 71; ROM 72 in which routines (programs) to be executed by the CPU 71, and tables (lookup tables, maps), constants, and the like are stored in advance; RAM 73 in which the CPU 71 temporarily stores data as needed; backup RAM 74, which stores data while power is held on and which retains the stored data even while power is held off; and an interface 75 including an AD converter. The interface 75 is connected to the sensors 61 to 68. Signals from the sensors 61 to 68 are supplied to the CPU 71 via the interface 75. In accordance with instructions from the CPU 71, the interface 75 sends out drive signals to the intake-valve control apparatus 33, the igniter 38, the injector 39, the throttle valve actuator 43a, etc.

(Control of Combustion Percentage and Control of Combustion Percentage Increase Amount)

Next will be briefly described control of combustion percentage MFB and control of an amount of increase ΔMFB of the combustion percentage MFB, which are performed by the control apparatus for the internal combustion engine 10 (hereinafter referred to as the "present apparatus") configured as described above.

In the present specification, the ratio (%) of an amount of combusted fuel (up to the present point in time), which increases continuously during the expansion stroke, to a total amount of fuel taken into the combustion chamber 25 of the internal combustion engine 10 in the intake stroke is referred to as a "combustion percentage MFB." This combustion percentage MFB also corresponds to a cumulative value of heat generated through combustion of fuel within the combustion chamber 25 up to the present point in time.

Figure 2:
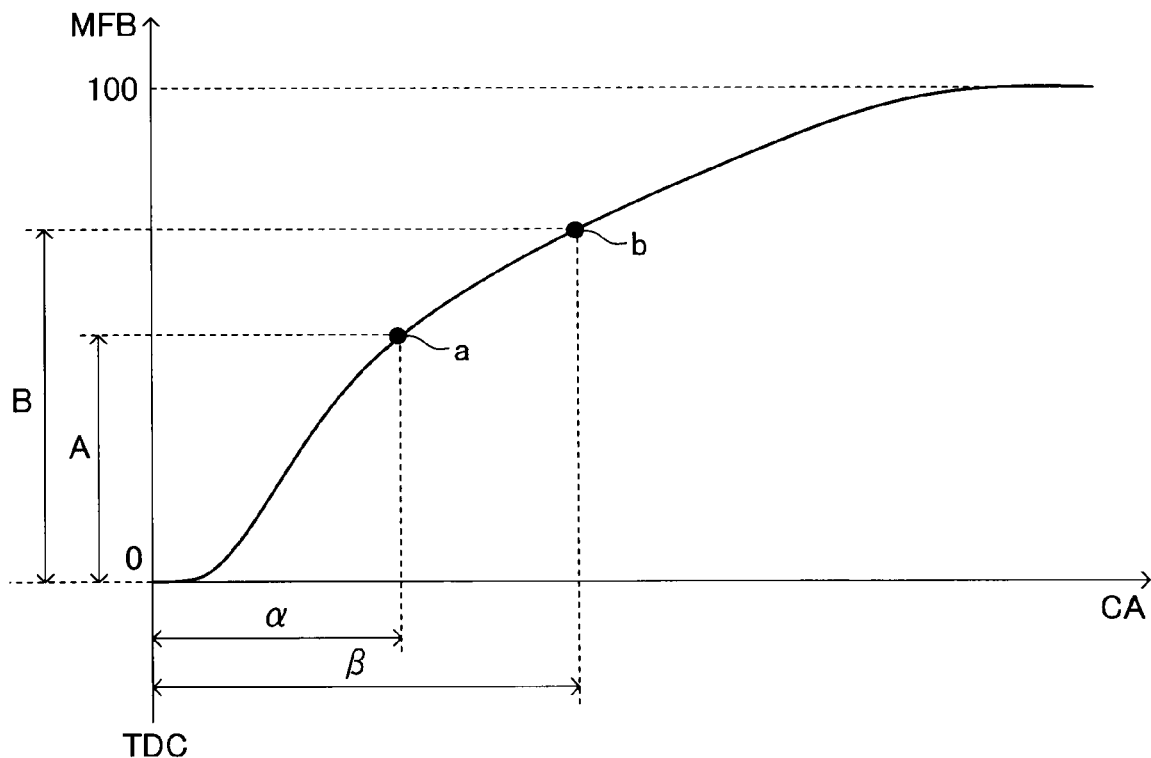
FIG. 2 is a graph showing an example change in combustion percentage in the expansion stroke with crank angle.

FIG. 2 is a graph showing an example change in the combustion percentage MFB in the expansion stroke with the crank angle CA. Notably, FIG. 2 shows a case where the ignition timing of the spark plug 37 is set to a point immediately before compression top dead center TDC (the crank angle: 0°).

As shown in FIG. 2, in the expansion stroke, the combustion percentage MFB increases with the crank angle CA as measured from the compression top dead center TDC. The manner (characteristic) in which the combustion percentage MFB increases with the crank angle CA can be controlled by means of adjusting the ignition timing (firing timing) SA of the spark plug 37 and the open timing VVT of the intake valve 32.

Figure 3:
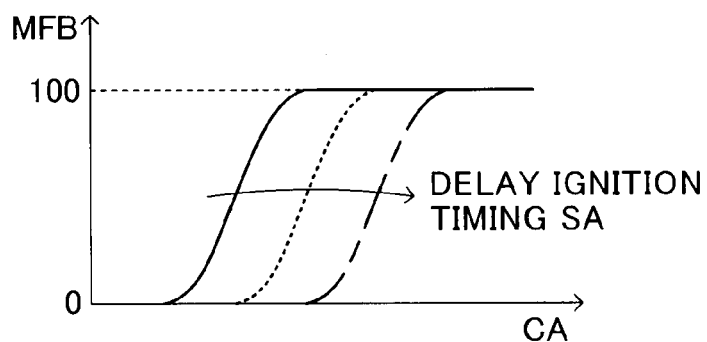
FIG. 3 is a graph showing a relation between ignition timing and an increasing curve which represents an increase in combustion percentage with crank angle.

FIG. 3 is a graph showing a relation between the ignition timing SA and an increasing curve which represents an increase in the combustion percentage MFB with the crank angle CA. As can be understood from FIG. 3, when the ignition timing SA is changed, a time at which the combustion percentage MFB starts to increase changes, but the increase gradient of the combustion percentage MFB (combustion speed) does not change.

Figure 4:
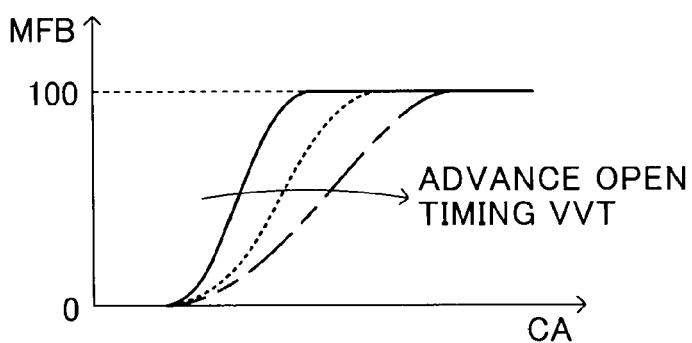
FIG. 4 is a graph showing a relation between intake-valve open timing and an increasing curve which represents an increase in combustion percentage with crank angle.

FIG. 4 is a graph showing a relation between the open timing VVT of the intake valve 32 and an increasing curve which represents an increase in the combustion percentage MFB with the crank angle CA. As can be understood from FIG. 4, when the open timing VVT of the intake valve 32 is changed (without changing the ignition timing SA), the time at which the combustion percentage MFB starts to increase does not change, but the increase gradient of the combustion percentage MFB (combustion speed) changes. Specifically, as the open timing VVT of the intake valve 32 is moved toward the advanced side, the increase gradient of the combustion percentage MFB decreases, because of the following reason.

That is, when the open timing VVT of the intake valve 32 is moved toward the advanced side, the overlap period is prolonged. When the overlap period is prolonged, the amount of combusted gas which returns from the exhaust passage to the combustion chamber 25 via the exhaust valve 35 (that is, the above-mentioned residual combusted gas amount) increases. The greater the residual combusted gas amount, the smaller the combustion speed of a gas-fuel mixture during the expansion stroke (accordingly, the smaller the above-mentioned increase gradient of the combustion percentage MFB), because of the increased degree of instability of combustion of the gas-fuel mixture, among other factors.

Meanwhile, the present inventor has found that the combustion efficiency (energy efficiency) can be maintained at a large value if the ignition timing SA (accordingly, firing timing) is controlled such that the combustion percentage MFB at a certain crank angle $\alpha$ (fixed) after the compression top dead center TDC (hereinafter called "MFB$\alpha$") assumes a certain value A (fixed) (see FIG. 2).

In addition, the present inventor has found that the output torque can be increased and the amount of HC within exhaust gas can be maintained at a small value, if the increase gradient of the combustion percentage (accordingly, the open timing VVT of the intake valve 32) is controlled such that an increase amount $\Delta$MFB of the combustion percentage MFB within a crank angle range from the compression top dead center TDC to a certain crank angle $\beta$ ($>\alpha$; fixed) after the compression top dead center TDC (hereinafter called "$\Delta$MFB$\beta$") assumes a certain value B ($>$A; fixed) (see FIG. 2). These findings are described in detail in Japanese Patent Application No. 2006-127409.

Figure 5:
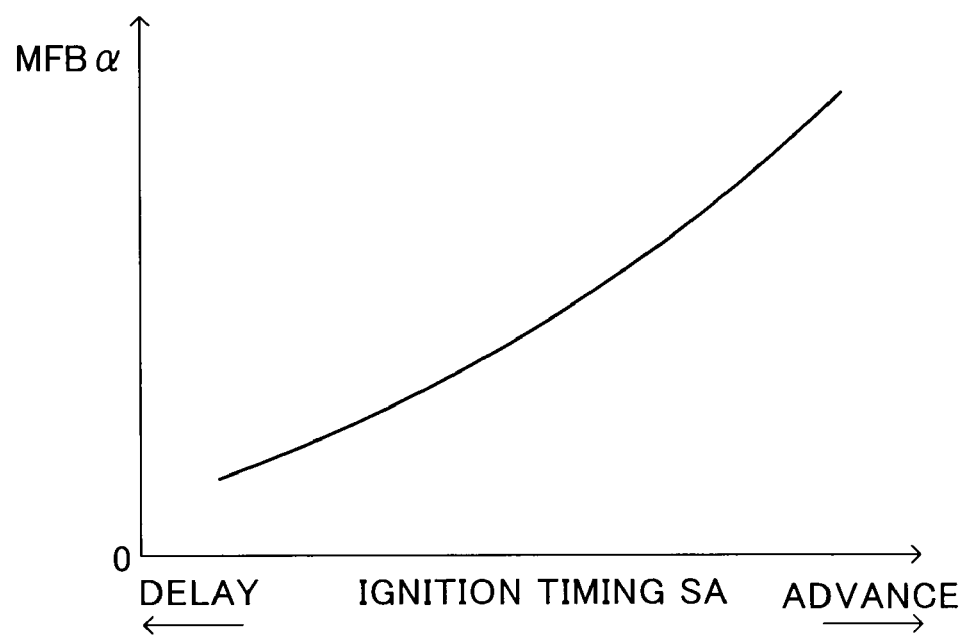
FIG. 5 is a graph showing a relation between ignition timing and combustion percentage at a predetermined crank angle.
Figure 6:
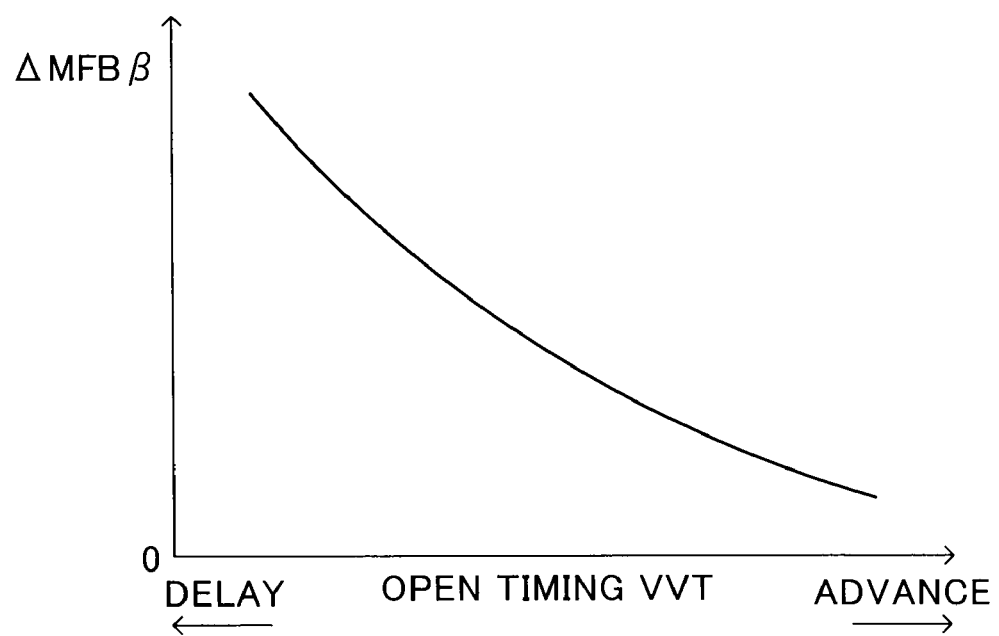
FIG. 6 is a graph showing a relation between intake-valve open timing and an amount of increase in combustion percentage within a predetermined crank angle range.

As is apparent from FIG. 3, the value MFB$\alpha$ tends to increase when the ignition timing SA is advanced, as shown in FIG. 5. Further, as is apparent from FIG. 4, the value $\Delta$MFB$\beta$ tends to decrease when the open timing VVT of the intake valve 32 is advanced, as shown in FIG. 6. By making use of these trends, the present apparatus controls the ignition timing SA such that the value MFB$\alpha$ coincides with the value A (corresponding to the above-mentioned ignition timing control), and controls the open timing VVT of the intake valve 32 such that the value $\Delta$MFB$\beta$ coincides with the value B (corresponding to the above-mentioned combustion-percentage increase amount control). The control of the ignition timing SA for rendering the MFB$\alpha$ equal to the value A is also called "MBT control," and the control of the open timing VVT of the intake valve 32 for rendering the value $\Delta$MFB$\beta$ equal to the value B is also called "$\Delta$MFB control."

(Actual Operation)

The present apparatus usually executes the above-mentioned MBT control and $\Delta$MFB control. In addition, the present apparatus detects a failure of the intake-valve control apparatus 33 by making use of the value $\Delta$MFB$\beta$. Hereinbelow, actual operations of the present apparatus for the MBT control, the $\Delta$MFB control, and the anomaly determination for the intake-valve control apparatus 33 will be described with reference to routines shown in FIGS. 7 to 10 and a time chart shown in FIG. 11.

Figure 7:
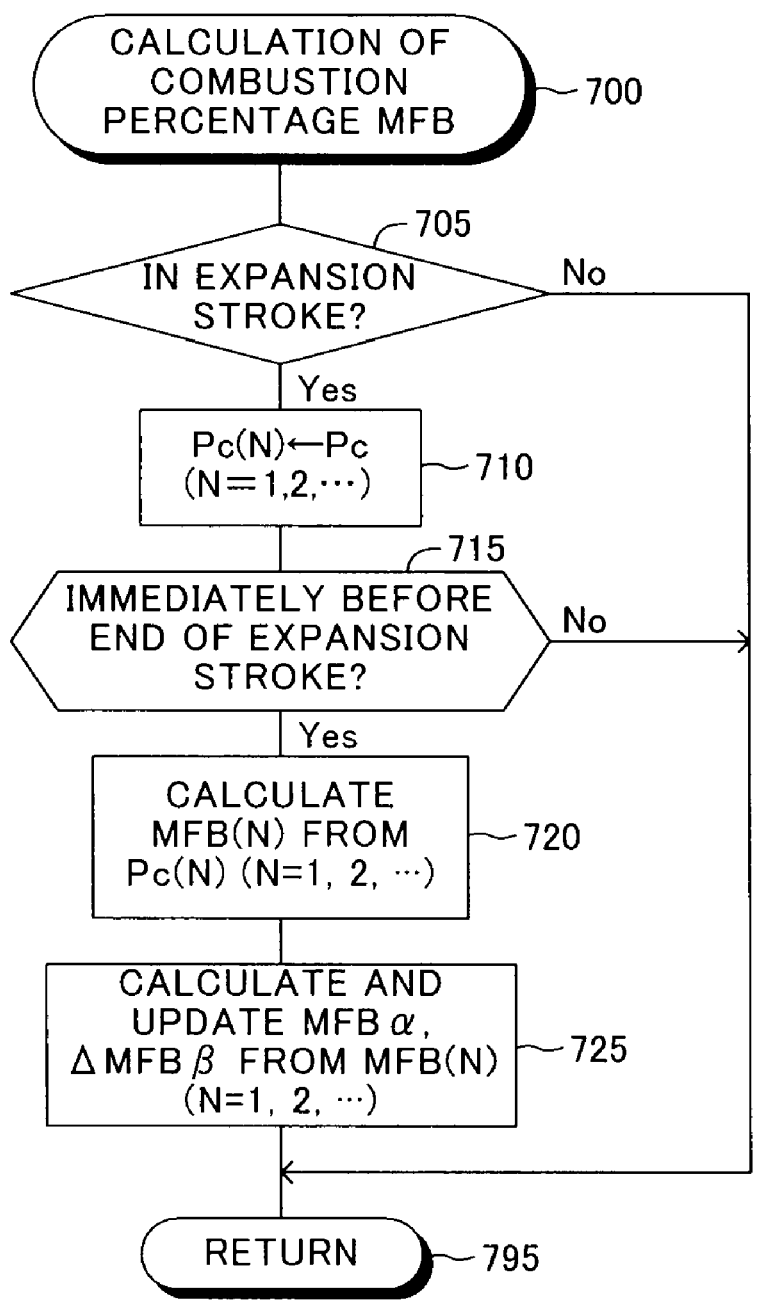
FIG. 7 is a flowchart showing a routine executed by a CPU shown in FIG. 1 so as to calculate the combustion percentage.

Each time the crankshaft rotates over a predetermined minute crank angle $\Delta$CA, the CPU 71 repeatedly executes for each cylinder a routine for calculating the combustion percentage MFB, which is shown in FIG. 7 in the form of a flowchart. Accordingly, when a predetermined timing is reached, the CPU 71 starts the processing from step 700 for a certain cylinder. The CPU 71 proceeds to step 705 and determines whether or not the engine is in the expansion stroke. When the CPU 71 makes a "No" determination, the CPU 71 proceeds directly to step 795, and ends the current execution of the present routine.

Meanwhile, when the engine is in the expansion stroke, the CPU 71 makes a "Yes" determination in step 705, and proceeds to step 710 so as to set and store, as a cylinder pressure sample value Pc(N), the present cylinder pressure Pc, which can be obtained from the cylinder pressure sensor 65. The argument N (N=1, 2, . . . ) is set to "1" when step 710 is first executed after the expansion stroke has started (that is, at a point in time immediately after the compression top dead center TDC), and, subsequently, is incremented by "1" every time step 710 is executed (that is, every time the crankshaft rotates over the minute crank angle $\Delta$CA). That is, the argument N assumes a value corresponding to the crank angle CA during the expansion stroke, and represents the number of cylinder pressure sample values Pc(N) stored up to the present point in time.

Subsequently, the CPU 71 proceeds to step 715, and determines whether or not the present point in time is immediately before the end of the expansion stroke. When the CPU 71 makes a "No" determination, the CPU 71 proceeds directly to step 795, and ends the current execution of the present routine. That is, during the expansion stroke, the above-described step 710 is repeatedly executed. As a result, the cylinder pressure sample value Pc(N) (N=1, 2, . . . ) is successively stored every time the crank angle CA (measured from the compression top dead center TDC) increases by the minute crank angle $\Delta$CA. In other words, over the expansion stroke, a change in the cylinder pressure Pc with the crank angle CA as measured from the compression top dead center TDC is stored.

When the present point in time is immediately before the end of the expansion stroke, the CPU 71 makes a "Yes" determination in step 715, and proceeds to step 720 so as to obtain combustion percentage sample vales MFB(N) (N=1, 2, . . . ) from the large number of cylinder pressure sample values Pc(N) (N=1, 2, . . . ) (that is, from the change in the cylinder pressure Pc over the expansion stroke) by making use of one of known methods. In other words, a change in the combustion percentage MFB with the crank angle CA in the expansion stroke (see FIG. 2) is obtained.

Next, the CPU 71 proceeds to step 725, and calculates the value MFB$\alpha$ and the value $\Delta$MFB$\beta$ in the present expansion stroke from the large number of the combustion percentage sample values MFB(N) (N=1, 2, . . . ). Subsequently, the CPU 71 proceeds directly to step 795, and ends the current execution of the present routine. In this manner, every time the expansion stroke ends, the value MFB$\alpha$ and the value $\Delta$MFB$\beta$ are calculated and updated. The routine of FIG. 7 corresponds to the above-mentioned combustion percentage acquisition means.

Figure 8:
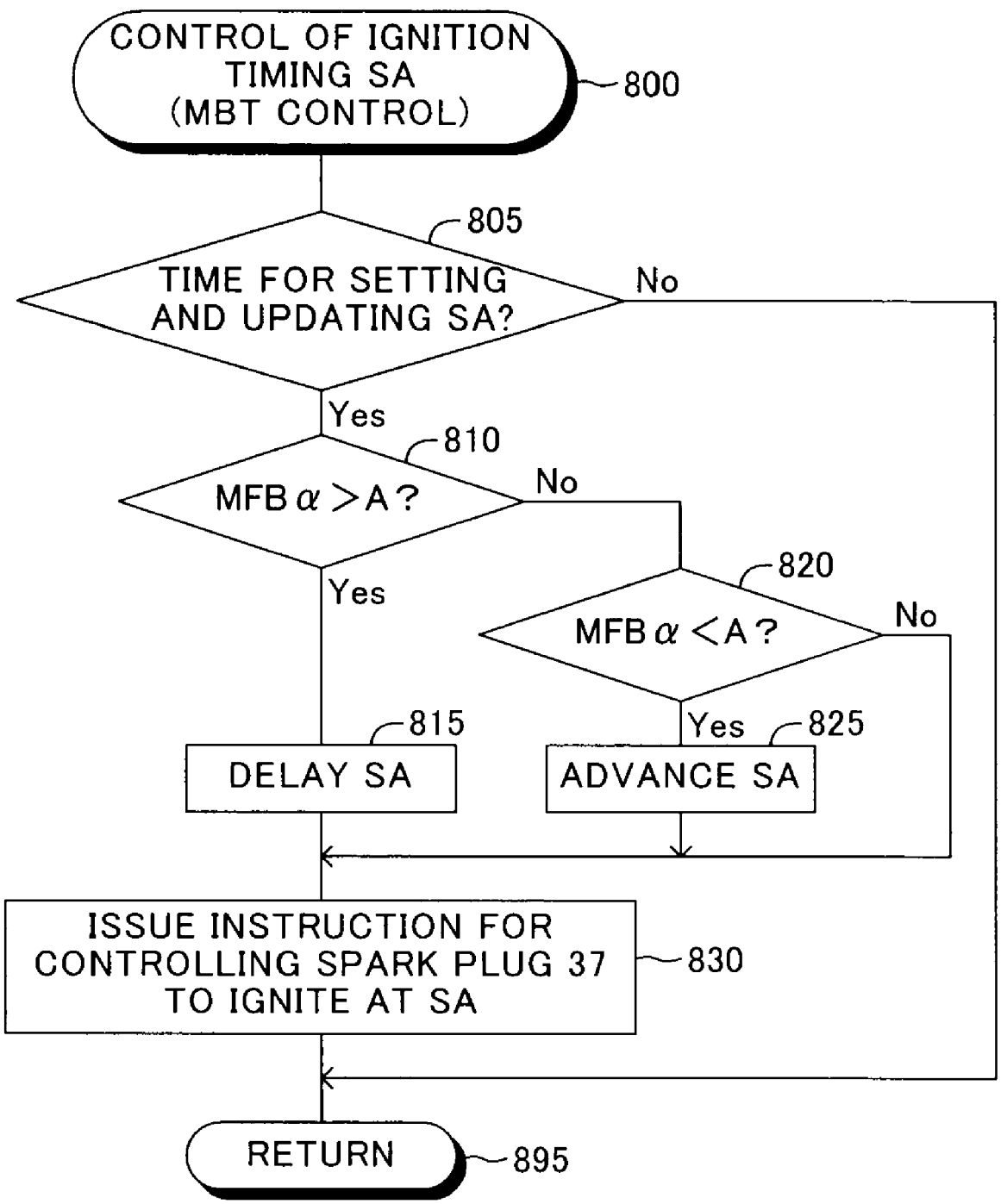
FIG. 8 is a flowchart showing a routine executed by the CPU shown in FIG. 1 so as to perform ignition timing control (MBT control).

Further, the CPU 71 repeatedly executes, for each cylinder, a routine for controlling the ignition timing SA (MBT control), which is shown in FIG. 8 in the form of a flowchart, in synchronism with the execution of the routine of FIG. 7. Accordingly, when a predetermined timing is reached, the CPU 71 starts the processing from step 800 for a certain cylinder. The CPU 71 proceeds to step 805, and determines whether or not a time for setting and updating the ignition timing SA has come. When the CPU 71 makes a "No" determination, the CPU 71 proceeds directly to step 895, and ends the current execution of the present routine. For example, the time for setting and updating the ignition timing SA is a point in time immediately after the end of the expansion stroke (that is, immediately after the value MFBα is updated by the processing of step 725 of FIG. 7).

When the time for setting and updating the ignition timing SA has come, the CPU 71 makes a "Yes" determination in step 805, and proceeds to step 810 so as to determine whether or not the newest value of the value MFBα updated in step 725 is greater than the value A (see FIG. 2). When the CPU 71 makes a "Yes" determination (MFBα>A), the CPU 71 proceeds to step 815 so as to delay the ignition timing SA from the present timing by a predetermined minute crank angle, and then proceeds to step 830.

Meanwhile, when the CPU 71 makes a "No" determination in step 810 (MFBα≦A), the CPU 71 proceeds to step 820 so as to determine whether or not the newest value of the value MFBα is smaller than the value A. When the CPU 71 makes a "Yes" determination (MFBα<A), the CPU 71 proceeds to step 825 so as to advance the ignition timing SA from the present timing by the predetermined minute crank angle, and then proceeds to step 830. When the CPU 71 makes a "No" determination in step 820 (MFBα=A), the CPU 71 proceeds directly to step 830 without changing the ignition timing SA from the present timing.

In step 830, the CPU 71 issues a control instruction to the spark plug 37 (actually, the igniter 38) such that the spark plug 37 effects ignition at the ignition timing SA in the next expansion stroke. The CPU 71 then proceeds to step 895, and ends the current execution of the present routine.

Thus, when MFBα>A, the ignition timing SA is delayed, whereby the value MFBα is decreased in the next expansion stroke (see FIG. 5). Meanwhile, when MFBα<A, the ignition timing SA is advanced, whereby the value MFBα is increased in the next expansion stroke (see FIG. 5). In this manner, the ignition timing SA is controlled such that the value MFBα becomes equal to the value A. That is, the MBT control is executed.

Figure 9:
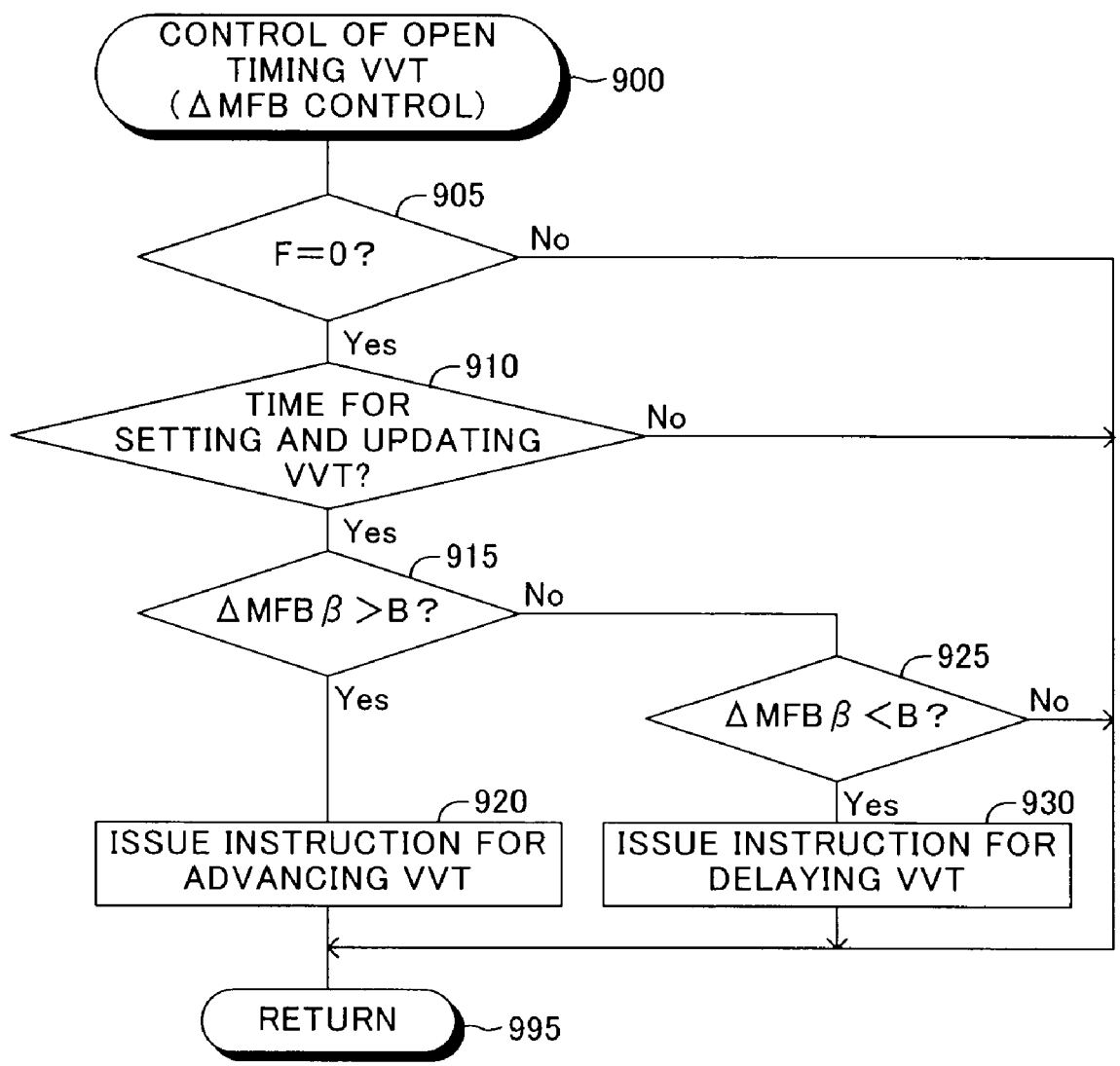
FIG. 9 is a flowchart showing a routine executed by the CPU shown in FIG. 1 so as to perform control of intake-valve open timing (ΔMFB control).

Further, the CPU 71 repeatedly executes, for each cylinder, a routine for controlling the open timing VVT of the intake valve 32 (ΔMFB control), which is shown in FIG. 9 in the form of a flowchart, in synchronism with the execution of the routine of FIG. 8. Accordingly, when a predetermined timing is reached, the CPU 71 starts the processing from step 900 for a certain cylinder. The CPU 71 proceeds to step 905, and determines whether or not the value of a flag F is "0."

When the value of the flag F is "1," the flag F represents that anomaly determination processing for the intake-valve control apparatus 33, which will be described later, is currently executed. When the value of the flag F is "0," the flag F represents that the anomaly determination processing is not currently executed. Accordingly, when the anomaly determination processing for the intake-valve control apparatus 33 is currently executed (F=1), the CPU 71 makes a "No" determination in step 905, and proceeds directly to step 995 so as to end the current execution of the present routine.

When the anomaly determination processing for the intake-valve control apparatus 33 is not currently executed (F=0), the CPU 71 makes a "Yes" determination in step 905, and proceeds to step 910 so as to determine whether or not a time for setting and updating the open timing VVT of the intake valve 32 has come. When the CPU 71 makes a "No" determination, the CPU 71 proceeds directly to step 995, and ends the current execution of the present routine. For example, the time for setting and updating the open timing VVT of the intake valve 32 is a point in time immediately after the end of the expansion stroke (that is, immediately after the value ΔMFBβ is updated by the processing of step 725 of FIG. 7).

When the time for setting and updating the open timing VVT of the intake valve 32 has come, the CPU 71 makes a "Yes" determination in step 910, and proceeds to step 915 so as to determine whether or not the newest value of the value ΔMFBβ updated in step 725 is greater than the value B (see FIG. 2). When the CPU 71 makes a "Yes" determination (ΔMFBβ>B), the CPU 71 proceeds to step 920 so as to instruct the intake-valve control apparatus 33 to advance the open timing VVT of the intake valve 32 from the present timing by a predetermined minute crank angle. Subsequently, the CPU 71 proceeds to step 995, and ends the current execution of the present routine.

Meanwhile, when the CPU 71 makes a "No" determination in step 915 (ΔMFBβ≦B)), the CPU 71 proceeds to step 925 so as to determine whether or not the newest value of the value ΔMFBβ is smaller than the value B. When the CPU 71 makes a "Yes" determination (ΔMFBβ<B), the CPU 71 proceeds to step 930 so as to instruct the intake-valve control apparatus 33 to delay the open timing VVT of the intake valve 32 from the present timing by the predetermined minute crank angle. Subsequently, the CPU 71 proceeds to step 995, and ends the current execution of the present routine. When the CPU 71 makes a "No" determination in step 925 (ΔMFBβ=B), without changing the open timing VVT of the intake valve 32 from the present timing, the CPU 71 proceeds directly to step 995 so as to end the current execution of the present routine.

Thus, when ΔMFBβ>B, the open timing VVT of the intake valve 32 is advanced, whereby the value ΔMFBβ is decreased in the next expansion stroke (see FIG. 6). Meanwhile, when ΔMFBβ<B, the open timing VVT of the intake valve 32 is delayed, whereby the value ΔMFBβ is increased in the next expansion stroke (see FIG. 6). In this manner, in the case where the anomaly determination processing for the intake-valve control apparatus 33 is not currently executed (F=0), the open timing VVT of the intake valve 32 is controlled such that the value ΔMFBβ becomes equal to the value B. That is, the ΔMFB control is executed. The routine of FIG. 9 corresponds to the above-mentioned "intake-valve control means for performing combustion-percentage-increase-amount control."

Figure 10:
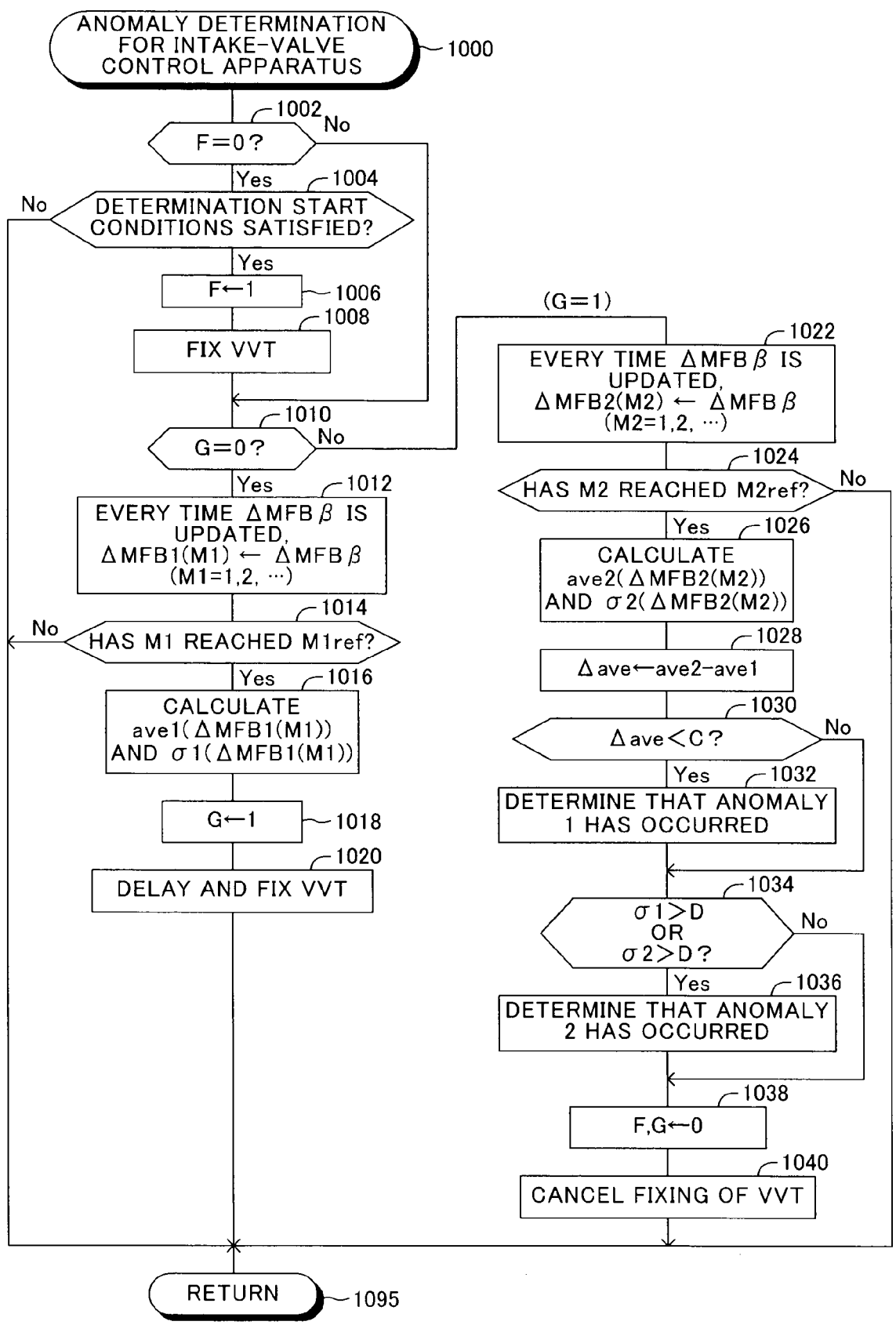
FIG. 10 is a flowchart showing a routine executed by the CPU shown in FIG. 1 so as to perform anomaly determination for an intake-valve control apparatus.

Further, the CPU 71 repeatedly executes, for each cylinder, a routine for performing anomaly determination for the intake-valve control apparatus 33, which is shown in FIG. 10 in the form of a flowchart, in synchronism with the execution of the routine of FIG. 9. Accordingly, when a predetermined timing is reached, the CPU 71 starts the processing from step 1000 for a certain cylinder. The CPU 71 proceeds to step 1002, and determines whether or not the value of the flag F is "0."

Here, the description will be continued under the assumption that F=0 (the anomaly determination processing for the intake-valve control apparatus 33 is not currently executed). In this case, the CPU 71 makes a "Yes" determination in step 1002, and proceeds to step 1004 so as to determine whether or not conditions for starting the anomaly determination for the intake-valve control apparatus 33 have been satisfied. When the CPU 71 makes a "No" determination, the CPU 71 proceeds directly to step 1095 so as to end the current execution of the present routine.

The conditions for starting the anomaly determination are satisfied, for example, when the engine is in a predetermined light load state where the engine speed NE is not greater than a predetermined value and the accelerator pedal operation amount Accp is not greater than a predetermined value; the engine is in a predetermined steady operation state where the amount of a change in the engine speed NE and the amount of a change in the accelerator pedal operation amount Accp in a period between a point in time which is a predetermined time before the present point in time and the present point in time are both not greater than respective predetermined values; and a predetermined period of time has elapsed from a point in time when the conditions for starting the anomaly determination for the intake-valve control apparatus 33 had last been satisfied.

Figure 11:
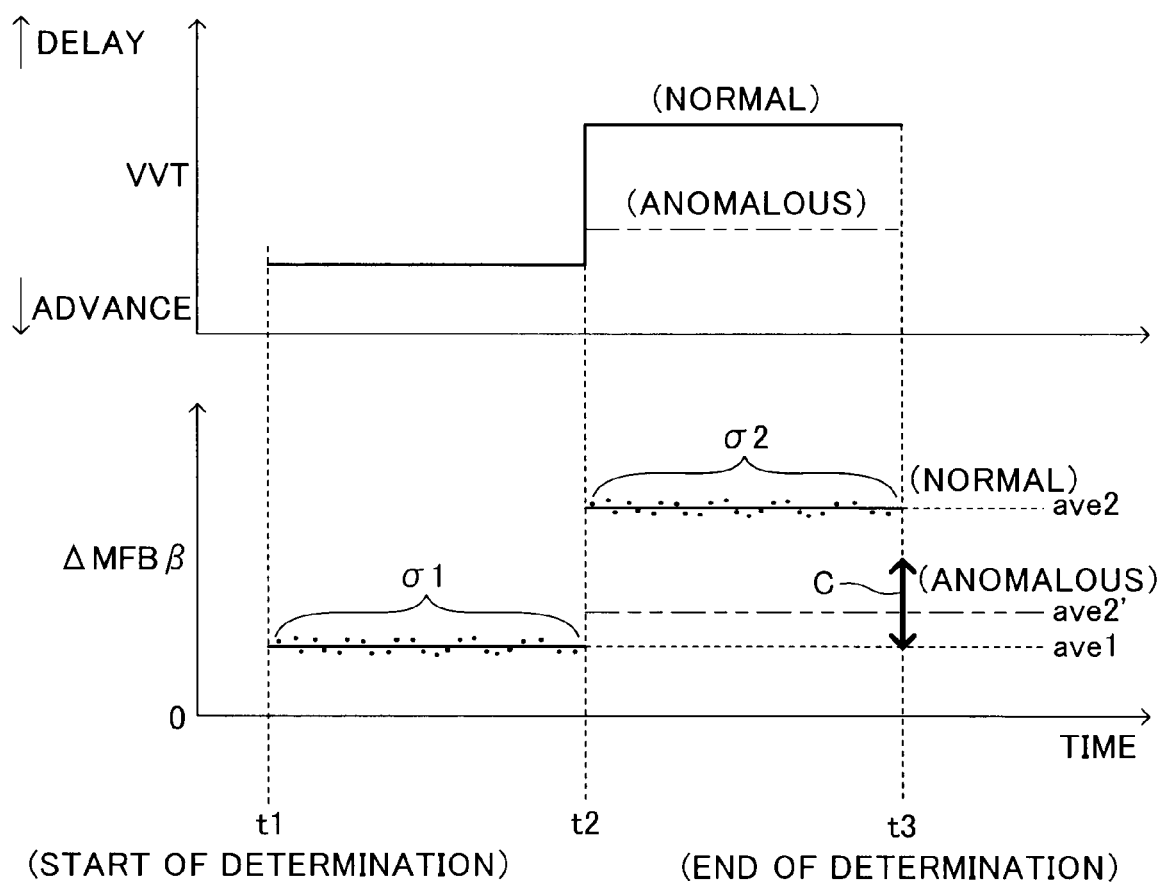
FIG. 11 is a time chart for explaining anomaly determination processing for the intake-valve control apparatus.

Here, the description will be continued under the assumption that the conditions for starting the anomaly determination have been satisfied (see time t1 of FIG. 11). In this case, the CPU 71 makes a "Yes" determination in step 1004, and then proceeds to step 1006 so as to change the value of the flag F to "1" from "0." Subsequently, in step 1008, the CPU 71 instructs the intake-valve control apparatus 33 to fix the open timing VVT of the intake valve 32 to the timing at the present point in time.

Thus, if the intake-valve control apparatus 33 is normal, the open timing VVT of the intake valve 32 is fixed to the timing used at time t1. If the intake-valve control apparatus 33 is anomalous, the open timing VVT of the intake valve 32 may fail to be fixed to the timing used at time t1. Notably, after that point in time, the value of the flag F is "0," so that the ΔMFB control by the routine of FIG. 9 is interrupted.

Subsequently, the CPU 71 proceeds to step 1010 so as to determine whether or not the value of a flag G is 0. The flag G becomes necessary when changing control is performed (instructed), as will be described later, for changing the open timing VVT of the intake valve 32 by a predetermined amount so as to perform anomaly determination for the intake-valve control apparatus 33 (see time t2 of FIG. 11). A period between t1 to t2 of FIG. 11 corresponds to a period during which the value of the flag G is 0, and a period between t2 to t3 of FIG. 11 corresponds to a period during which the value of the flag G is 1.

Here, the value of the flag G is assumed to be 0. In this case, the CPU 71 makes a "Yes" determination in step 1010, and proceeds to step 1012 so as to set and store, as a sample value ΔMFB1(M1) of ΔMFBβ, the updated newest value ΔMFBβ, every time the value ΔMFBβ is updated in step 725 of FIG. 7 (that is, every time the expansion stroke ends). The argument M1 (M1=1, 2, . . . ) is set to "1" when the sample value ΔMFB1(M1) is first set and stored in step 1012 (that is, a point in time immediately after time t1 of FIG. 11) after the anomaly determination start conditions have been satisfied ("Yes" in step 1004), and, subsequently, is incremented by "1" every time the sample value ΔMFB1(M1) is newly set and stored (that is, every time the expansion stroke ends). Thus, the argument M1 represents the number of the sample values ΔMFB1(M1) stored up to the present point in time.

Subsequently, the CPU 71 proceeds to step 1014, and determines whether or not the value of the argument M1 reaches a predetermined value M1ref (that is, whether or not the number of the sample values ΔMFB1(M1) reaches M1ref). When the CPU 71 makes a "No" determination, the CPU 71 proceeds directly to step 1095, and ends the current execution of the present routine.

After that point in time, until the value of the argument M1 reaches the value M1ref, the CPU 71 repeatedly executes the processing of step 1002 (makes a "No" determination), step 1010 (makes a "Yes" determination), step 1012, and step 1014 (makes a "No" determination). As a result, the sample values ΔMFB1(M1) (M1=1, 2, . . . ) are stored one by one every time the expansion stroke ends (see a large number of dots between time t1 to t2 of FIG. 11). In other words, in a state in which the open timing VVT of the intake valve 32 is fixed to the timing used at time t1 of FIG. 11 (this does not apply to the case where the intake-valve control apparatus 33 is anomalous), a change in the value MFBβ over the time t1 to t2 of FIG. 11 is stored.

When the value of the argument M1 has reached the value M1ref (see time t2 of FIG. 11), the CPU 71 makes a "Yes" determination in step 1014, and proceeds to step 1016. In step 1016, the CPU 71 calculates an average ave1(ΔMFB1(M1)) and a standard deviation σ1(ΔMFB1(M1)) of the sample values MFB1(M1) (M1=1, 2, . . . , M1ref), whose number is M1ref.

Subsequently, the CPU 71 proceeds to step 1018 so as to change the value of the flag G to "1" from "0," and then proceeds to step 1020 so as to instruct the intake-valve control apparatus 33 to delay the open timing VVT of the intake valve 32 from the timing at the present point in time by the predetermined crank angle and fix the open timing VVT. Thus, if the intake-valve control apparatus 33 is normal, the open timing VVT of the intake valve 32 is advanced by the predetermined crank angle and fixed (see a solid line after time t2 of FIG. 11). If the intake-valve control apparatus 33 is anomalous, the open timing VVT of the intake valve 32 does not change, or the delay amount of the open timing VVT becomes smaller than the predetermined crank angle (see a line of alternating long and two short dashes after time t2 of FIG. 11).

After that point in time, since the value of the flag G is 1, the CPU 71 makes a "No" determination when it proceeds to step 1010, and proceeds to step 1022. When the CPU 71 proceeds to step 1022, as in the above-described step 1012, the CPU 71 sets and stores, as a sample value ΔMFB2(M2) of ΔMFBβ, the updated newest value ΔMFBβ, every time the value ΔMFBβ is updated in step 725 of FIG. 7 (that is, every time the expansion stroke ends). The argument M2 (M2=1, 2, . . . ) is set to "1" when the sample value ΔMFB2(M2) is first set and stored in step 1022 (that is a point in time immediately after time t2 of FIG. 11) after the value of the argument M1 has reached the value M1ref ("Yes" in step 1014), and, subsequently, is incremented by "1" every time the sample value ΔMFB2(M2) is newly set and stored (that is, every time the expansion stroke ends). Thus, the argument M2 represents the number of the sample values ΔMFB2(M2) stored up to the present point in time.

Subsequently, the CPU 71 proceeds to step 1024, and determines whether or not the value of the argument M2 has reached a predetermined value M2ref (that is, whether or not the number of the sample values ΔMFB2(M2) has reached M2ref). When the CPU 71 makes a "No" determination, the CPU 71 proceeds directly to step 1095, and ends the current execution of the present routine.

After that point in time, until the value of the argument M2 reaches the value M2ref, the CPU 71 repeatedly execute the processing of step 1002 (makes a "No" determination), step 1010 (makes a "No" determination), step 1022, and step 1024 (makes a "No" determination). As a result, the sample values ΔMFB2(M2) (M2=1, 2, . . . ) are stored one by one every time the expansion stroke ends (see a large number of dots between time t2 to t3 of FIG. 11). In other words, in a state in which the open timing VVT of the intake valve 32 is fixed to the timing used immediately after time t2 of FIG. 11 (this does not apply to the case where the intake-valve control apparatus 33 is anomalous), a change in the value MFBβ over the time t2 to t3 of FIG. 11 is stored.

When the value of the argument M2 has reached the value M2ref (see time t3 of FIG. 11), the CPU 71 makes a "Yes" determination in step 1024, and proceeds to step 1026. In step 1026, the CPU 71 calculates an average ave2(ΔMFB2(M2))

and a standard deviation $\sigma2(\Delta MFB2(M2))$ of the sample values MFB2(M2) (M2=1, 2, ..., M2ref), whose number is M2ref.

Subsequently, the CPU 71 proceeds to step 1028 so as to set or store, as a change amount $\Delta$ave of $\Delta MFB\beta$, a value (ave2−ave1) obtained by subtracting the average ave1 calculated in step 1016 from the average ave2 calculated in step 1026.

Here, the change amount $\Delta$ave of $\Delta MFB\beta$ will be described. As described above, the value $\Delta MFB\beta$ strongly depends on the above-mentioned residual combusted gas amount (accordingly, the open timing VVT of the intake valve 32), and the greater the amount by which the open timing VVT of the intake valve 32 is delayed, the greater the value $\Delta MFB\beta$. Accordingly, if the open timing VVT of the intake valve 32 is actually changed (delayed) by the above-mentioned predetermined crank angle at time t2 (that is, if the intake-valve control apparatus 33 is normal) (see the solid line after time t2 of FIG. 11), the change amount $\Delta$ave (=ave2−ave 1) of $\Delta MFB\beta$ becomes a value corresponding to the above-mentioned crank angle. This value is assumed to be greater than a value C (see a thick arrow of FIG. 11). Meanwhile, if the open timing VVT of the intake valve 32 actually fails to be changed by the above-mentioned predetermined crank angle (that is, if the intake-valve control apparatus 33 is anomalous) (see the line of alternating long and two short dashes after time t2 of FIG. 11), the change amount $\Delta$ave (=ave2'-ave 1) of $\Delta MFB\beta$ becomes a value smaller than the above-mentioned value C.

Subsequently, the CPU 71 proceeds to step 1030, and determines whether or not the change amount $\Delta$ave of $\Delta MFB\beta$ is smaller than the value C. When the CPU 71 makes a "No" determination, the CPU 71 proceeds directly to step 1034. Meanwhile, when the CPU 71 makes a "Yes" determination, the CPU 71 proceeds to step 1032, and determines that an "anomaly 1" has occurred in the intake-valve control apparatus 33. The CPU 71 then proceeds to step 1034. This "anomaly 1" represents an anomaly of the intake-valve control apparatus 33 corresponding to the case where in actuality the open timing VVT of the intake valve 32 cannot be changed by the above-mentioned crank angle immediately after time t2 of FIG. 11. This "anomaly 1" corresponds, for example, to the case where an abnormally increased friction force is produced at the time of relative rotation between the intake camshaft and the intake cam (mechanical lock of the intake-valve control apparatus 33).

When the CPU 71 proceeds to step 1034, it determines whether or not the standard deviation $\sigma1$ is greater than a predetermined value D or the standard deviation $\sigma2$ is greater than the predetermined value D. When the CPU 71 makes a "No" determination (that is, $\sigma1$, $\sigma2$<D), the CPU 71 proceeds directly to step 1038. Meanwhile, when the CPU 71 makes a "Yes" determination, the CPU 71 proceeds to step 1036, and determines that an "anomaly 2" has occurred in the intake-valve control apparatus 33. The CPU 71 then proceeds to step 1038. This "anomaly 2" represents an anomaly of the intake-valve control apparatus 33 corresponding to the case where, even though an instruction has been issued so as to fix the open timing VVT of the intake valve 32 in the period between t1 and t2 or the period between t2 and t3 of FIG. 11, in actuality, the open timing VVT changes, and variation of the value $\Delta MFB\beta$ increases, whereby the deviation $\sigma1$ or $\sigma2$ increases. This "anomaly 2" corresponds, for example, to the case where oil pressure, which serves as a drive source for relative rotation between the intake camshaft and the intake cam, has dropped.

When the CPU 71 proceeds to step 1038, the CPU 71 returns the values of the flags F and G to "0" from "1." In step 1040 subsequent thereto, the CPU 71 cancels the instruction for fixing the open timing VVT of the intake valve 32. After that, the CPU 71 proceeds to step 1095, and ends the current execution of the present routine. Since the value of the flag F is 0 after that point in time, a "Yes" determination is again made in step 1002, and monitoring is performed again in step 1004 so as to determine whether or not the conditions for starting the anomaly determination for the intake-valve control apparatus 33 are satisfied. In addition, since the value of the flag F is 0, the $\Delta MFB$ control by the routine of FIG. 9 is resumed. The routine of FIG. 10 corresponds to the above-mentioned failure detection means.

As described above, according the embodiment of the control apparatus for an internal combustion engine of the present invention, usually, the ignition timing SA is controlled such that the combustion percentage (the value $MFB\alpha$) at the predetermined crank angle $\alpha$ in the expansion stroke becomes equal to a target value (the value A) (MBT control), and the open timing VVT of the intake valve 32 is controlled such that the increase amount (the value $\Delta MFB\beta$) of the combustion percentage within the predetermined crank angle range $\beta$ in the expansion stroke becomes equal to a increase amount target value (the value B) ($\Delta MFB$ control; the above-mentioned combustion-percentage-increase-amount control).

When predetermined conditions, including a condition that the engine is in a predetermined light load state, (in place of the $\Delta MFB$ control), after execution of maintaining control for instructing the intake-valve control apparatus 33 to fix the open timing VVT of the intake valve 32, changing control for instructing the intake-valve control apparatus 33 to change (delay) the open timing VVT by a predetermined amount is executed, and maintaining control for instructing the intake-valve control apparatus 33 to fix the open timing VVT again is executed. There is used a change amount $\Delta$ave (=ave2−ave1) between (the average ave1 of a large number of sample values $\Delta MFB1(M1)$) of the value $\Delta MFB\beta$ during the maintaining control before execution of the changing control and (the average ave2 of a large number of sample values $\Delta MFB2(M2)$) of the value $\Delta MFB\beta$ during the maintaining control after execution of the changing control. When the change amount $\Delta$ave (=ave2−ave1) is less than the predetermined value C, the "anomaly 1" is determined to have occurred in the intake-valve control apparatus 33. This "anomaly 1" corresponds to, for example, a failure of the intake-valve control apparatus 33 such as mechanical lock.

In addition, there are used the degree of change of the value $\Delta MFB\beta$ during the maintaining control before execution of the changing control (the standard deviation $\sigma1$ of the large number of sample values $\Delta MFB1(M1)$) and the degree of change of the value $\Delta MFB\beta$ during the maintaining control after execution of the changing control (the standard deviation $\sigma2$ of the large number of sample values $\Delta MFB2(M2)$). When the standard deviation $\sigma1$ or $\sigma2$ is greater than the predetermined value D, the "anomaly 2" is determined to have occurred in the intake-valve control apparatus 33. This "anomaly 2" corresponds to, for example, a failure in which oil pressure, which serves as a drive source for relative rotation between the intake camshaft and the intake cam, has dropped.

These failure determinations are based on the facts that the value $\Delta MFB\beta$ strongly depends on the above-mentioned residual combusted gas amount (accordingly, the above-mentioned overlap period; that is, the open timing VVT of the intake valve 32), and the greater the amount by which the open timing VVT of the intake valve 32 is delayed, the greater the value $\Delta MFB\beta$. As described above, an anomaly of the intake-valve control apparatus 33 is determined by making use of the value ΔMFBβ, which strongly depends on the open timing VVT of the intake valve 32. Therefore, an anomaly (failure) of the intake-valve control apparatus 33 can be detected accurately.

The present invention is not limited to the above-described embodiment, and various modifications can be employed within the scope of the present invention. For example, in the above-described embodiment, during a period in which the anomaly determination processing for the intake-valve control apparatus 33 is being executed (F=1), the above-mentioned maintaining control and changing control are executed instead of the ΔMFB control. However, an "anomaly" of the intake-valve control apparatus 33 may be determined to have occurred when the deviation of the ΔMFBβ (the combustion percentage increase amount) from the value B (the increase amount target value) is greater than a predetermined value during the ΔMFB control. In this case, the routine of FIG. 10 is eliminated, and step 905 of the routine of FIG. 9 is eliminated. Instead, a step for "determining that an anomaly has occurred when |ΔMFBβ−B|>a value E" is inserted between steps 920 and 930 and step 995.

In the above-described embodiment, during the ΔMFB control, the value B (the increase amount target value), which is the target value of the value ΔMFBβ, is fixed. However, the value B may be changed in accordance with operating conditions (e.g., intake air (mass) flow rate Ga, engine speed NE, etc.). In the case where the value B is changed during the ΔMFB control in accordance with the operating conditions, an "anomaly" of the intake-valve control apparatus 33 may be determined to have occurred when the value B (the increase amount target value) has been changed by a predetermined amount during the ΔMFB control and a change amount between the value ΔMFBβ before the value B is changed and the value ΔMFBβ after the value B has been changed is less than the predetermined amount (or less than a value slightly smaller than the predetermined amount).

In the above-described embodiment, usually, the ΔMFB control is performed so as to control the open timing VVT of the intake valve 32 such that the increase amount (the value ΔMFBβ) of the combustion percentage becomes equal to the increase amount target value (the value B). However, the above-described embodiment may be modified in such a manner that "VVT control" is usually executed so as to determine a target value VVTt (open timing target value) of the open timing VVT of the intake valve 32 in accordance with operating conditions (e.g., intake air (mass) flow rate Ga, engine speed NE, etc.) and control the open timing VVT of the intake valve 32 such that the open timing VVT coincides with the target value VVTt. This VVT control is achieved through feedback control performed, for example, such that the detected value of the open timing VVT of the intake valve 32, which can be obtained from the intake cam rotational angle sensor 63, coincides with the target value VVTt.

In the case where the VVT control is usually executed as described above, the above-described ΔMFB control may be executed in place of the VVT control when an anomaly of the intake-valve control apparatus 33 is detected through, for example, execution of the routine of FIG. 10 and the cause of the anomaly is an anomaly of the intake cam rotational angle sensor 63 or a drop in the oil pressure, which serves as a drive source for relative rotation between the intake camshaft and the intake cam. This is based on the fact that changing the open timing VVT of the intake valve 32 (accordingly, adjusting the value ΔMFBβ) is still possible. The target value B of the value ΔMFBβ in this case may be the same as that employed in the above-described embodiment, or a value (fixed) equal to the value ΔMFBβ at the time when the anomaly of the intake-valve control apparatus 33 is detected.

By virtue of this control, the operation of the internal combustion engine can be continued stably even after the anomaly of the intake-valve control apparatus 33 has occurred.

In the above-described embodiment, an apparatus corresponding to the intake-valve control apparatus 33 is not employed for the exhaust valve 35 side. However, an exhaust-valve control apparatus which adjusts and controls the close timing (open and close timings) of the exhaust valve 35 may be provided. In such a case, there may be employed an apparatus in which usually the above-described VVT control is executed on the intake valve 32 side, and VVT control (control for rendering the close timing of the exhaust valve 35 coincident with a target value), which is similar to that performed for the intake valve 32, is performed on the exhaust valve 35 side as well.

In such an apparatus, an anomaly of the intake-valve control apparatus 33 can be detected through execution of the routine of FIG. 10 for the intake valve 32 side, and an anomaly of the exhaust-valve control apparatus can also be detected through execution of a routine (not shown) for the exhaust valve 35, the routine being similar to the routine of FIG. 10.

In such an apparatus, when an anomaly of the intake-valve control apparatus 33 is detected in a period in which the above-described VVT control is executed for both the intake valve 32 and the exhaust valve 32, the VVT control on the intake valve 32 side is interrupted (the open timing VVT of the intake valve 32 is fixed), and a ΔMFB control (control for rendering the value ΔMFBβ coincident with the target value B), which is similar to the above-described ΔMFB control may be executed for the exhaust valve 35 in place of the VVT control. This is based on the fact that even when a failure of the intake-valve control apparatus 33 has occurred, the ΔMFB control can be continued by use of the exhaust-valve control apparatus only. The target value B of the value ΔMFBβ in this case may be the same as that employed in the above-described embodiment, or a value (fixed) equal to the value ΔMFBβ at the time when the anomaly of the intake-valve control apparatus 33 is detected. By virtue of this control, the operation of the internal combustion engine can be continued stably even after the anomaly of the intake-valve control apparatus 33 has occurred.

Similarly, in such an apparatus, when an anomaly of the exhaust-valve control apparatus is detected in a period in which the above-described VVT control is executed for both the intake valve 32 and the exhaust valve 32, the VVT control on the exhaust valve 35 side is interrupted (the close timing of the exhaust valve 35 is fixed), and the above-described ΔMFB control (control for rendering the value ΔMFBβ coincident with the target value B) may be executed for the intake valve 32 in place of the VVT control. This is based on the fact that even when a failure of the exhaust-valve control apparatus has occurred, the ΔMFB control can be continued by use of the intake-valve control apparatus 33 only. The target value B of the value ΔMFBβ in this case may be the same as that employed in the above-described embodiment, or a value (fixed) equal to the value ΔMFBβ at the time when the anomaly of the exhaust-valve control apparatus is detected. By virtue of this control, the operation of the internal combustion engine can be continued stably even after the anomaly of the exhaust-valve control apparatus has occurred.

In the above-described embodiment, the intake-valve control apparatus 33 is configured to adjust the open and close timings of the intake valve 32 only. However, the intake-valve control apparatus 33 may be configured to adjust the maximum lift amount of the intake valve 32 in addition to the open and close timings of the intake valve 32.

In the above-described embodiment, the ΔMFB control (control for rendering the value ΔMFBβ coincident with the target value B) is carried out through execution of the routine of FIG. 9. However, the ΔMFB control may be carried out through performance of PID control on the basis of the deviation (B−ΔMFBβ). Similarly, in the above-described embodiment, the MBT control (control for rendering the value MFBα coincident with the target value A) is carried out through execution of the routine of FIG. 8. However, the MBT control may be carried out through performance of PID control on the basis of the deviation (A−MFBα).

In the above-described embodiment, the target value A of the value MFBα is fixed during the MBT control. However, the value A may be changed in accordance with operating conditions (e.g., intake air (mass) flow rate Ga, engine speed NE, etc.).

In the above-described embodiment, the "anomaly 1" of the intake-valve control apparatus 33 is determined by making use of the change amount Δave, and the "anomaly 2" of the intake-valve control apparatus 33 is determined by making use of the standard deviation σ1, σ2. However, only one of the "anomaly 1" and the "anomaly 2" may be determined.

In the above-described embodiment, in step 1032 and step 1036 of FIG. 10, the CPU 71 determines that an anomaly has occurred in the intake-valve control apparatus 33. However, the CPU 71 may determine that an anomaly has occurred in the control apparatus for the internal combustion engine 10. Example anomalies of the control apparatus for the internal combustion engine 10 include anomalies of the combustion percentage acquisition means (specifically, an anomaly of the cylinder pressure sensor 65, the calculation itself of the combustion percentage MFB in step 720 of FIG. 7, etc.), anomalies of the ignition apparatus (specifically, anomalies of the spark plug 37 and the igniter 38), and anomalies of the fuel injection apparatus (specifically, an anomaly of the injector 39).

In the above-described embodiment, in step 725, the increase amount ΔMFBβ of the combustion percentage is calculated from the combustion percentage sample values MFB(N) calculated in step 720 of FIG. 7. However, the embodiment may be configured such that, through use of one of known methods, the increase amount ΔMFBβ of the combustion percentage is calculated on the basis of the deviation between the combustion percentage MFBα calculated in step 725 (corresponding to the above-mentioned "combustion percentage at the predetermined crank angle") and the value A (corresponding to the above-mentioned "combustion percentage target value").

The invention claimed is:

1. A control apparatus for an internal combustion engine including an intake-valve control apparatus which controls at least open timing of an intake valve of the internal combustion engine, the engine control apparatus comprising:
   intake-valve control means for performing open timing control which causes the intake-valve control apparatus to control the open timing of the intake valve such that the open timing of the intake valve coincides with an open timing target value;
   combustion percentage acquisition means for acquiring a change in combustion percentage with crank angle, the combustion percentage being the ratio of an amount of combusted fuel, which increases continuously during an expansion stroke, to a total amount of fuel taken into a combustion chamber of the internal combustion engine in an intake stroke; and
   failure detection means for detecting a failure of the intake-valve control apparatus by making use of an increase amount of the combustion percentage within a predetermined crank angle range during the expansion stroke, the increase amount changing as a result of control of the open timing of the intake valve by the intake-valve control apparatus, wherein
   the intake valve control means is configured such that, when the failure detection means has determined that the intake-valve control apparatus has a failure, the intake-valve control means performs, in place of the open timing control, combustion-percentage-increase-amount control which causes the intake-valve control apparatus to control the open timing of the intake valve such that the combustion percentage increase amount coincides with an increase amount target value.

2. A control apparatus for an internal combustion engine according to claim 1, wherein the failure detection means is configured to detect a failure of the intake-valve control apparatus by causing the intake-valve control apparatus to execute changing control for changing the open timing of the intake valve by a predetermined amount, and making use of an amount of change between the combustion percentage increase amount before execution of the changing control and after execution of the changing control.

3. A control apparatus for an internal combustion engine according to claim 2, wherein the failure detection means is configured to determine that the intake-valve control apparatus has a failure when the amount of change in the combustion percentage increase amount is less than a predetermined value.

4. A control apparatus for an internal combustion engine according to claim 1, wherein the failure detection means is configured to detect a failure of the intake-valve control apparatus by causing the intake-valve control apparatus to execute maintaining control for maintaining constant the open timing of the intake valve, and making use of the degree of a change in the combustion percentage increase amount during execution of the maintaining control.

5. A control apparatus for an internal combustion engine according to claim 4, wherein the failure detection means is configured to determine that the intake-valve control apparatus has a failure when the degree of the change in the combustion percentage increase amount during execution of the maintaining control is greater than a predetermined degree.

6. A control apparatus for an internal combustion engine according to claim 1, wherein the failure detection means is configured to detect the failure when the internal combustion engine is in a light load state in which the load of the internal combustion engine is lighter than a predetermined level.

7. A control apparatus for an internal combustion engine according to claim 1, further comprising ignition timing control means for performing ignition timing control which controls the timing of ignition effected by an ignition apparatus such that the combustion percentage at a predetermined crank angle during the expansion stroke coincides with a combustion percentage target value, wherein the failure detection means is configured to acquire the combustion percentage increase amount on the basis of a deviation of the combustion percentage at the predetermined crank angle during the ignition timing control from the combustion percentage target value.

8. A control apparatus for an internal combustion engine including an intake-valve control apparatus which controls at least open timing of an intake valve of the internal combustion engine, and an exhaust-valve control apparatus for controlling at least close timing of an exhaust valve of the internal combustion engine, the engine control apparatus comprising:

intake-valve control means for performing open timing control which causes the intake-valve control apparatus to control the open timing of the intake valve such that the open timing of the intake valve coincides with an open timing target value;

exhaust-valve control means for performing close timing control which causes the exhaust-valve control apparatus to control the close timing of the exhaust valve such that the close timing of the exhaust valve coincides with a close timing target value;

combustion percentage acquisition means for acquiring a change in combustion percentage with crank angle, the combustion percentage being the ratio of an amount of combusted fuel, which increases continuously during an expansion stroke, to a total amount of fuel taken into a combustion chamber of the internal combustion engine in an intake stroke; and failure detection means for detecting a failure of the intake-valve control apparatus and a failure of the exhaust-valve control apparatus by making use of an increase amount of the combustion percentage within a predetermined crank angle range during the expansion stroke, the increase amount changing as a result of control of the open timing of the intake valve by the intake-valve control apparatus and control of the close timing of the exhaust valve by the exhaust-valve control apparatus, wherein the exhaust-valve control means is configured such that, when the failure detection means has determined that the intake-valve control apparatus has a failure, the exhaust-valve control means performs, in place of the close timing control, combustion-percentage-increase-amount control which causes the exhaust-valve control apparatus to control the close timing of the exhaust valve such that the combustion percentage increase amount coincides with an increase amount target value; and the intake-valve control means is configured such that, when the failure detection means has determined that the exhaust-valve control apparatus has a failure, the intake-valve control means performs, in place of the open timing control, combustion-percentage-increase-amount control which causes the intake-valve control apparatus to control the open timing of the intake valve such that the combustion percentage increase amount coincides with the increase amount target value.

9. A control apparatus for an internal combustion engine according to claim 8, wherein the failure detection means is configured to detect a failure of the intake-valve control apparatus by causing the intake-valve control apparatus to execute changing control for changing the open timing of the intake valve by a predetermined amount, and making use of an amount of change between the combustion percentage increase amount before execution of the changing control and after execution of the changing control.

10. A control apparatus for an internal combustion engine according to claim 9, wherein the failure detection means is configured to determine that the intake-valve control apparatus has a failure when the amount of change in the combustion percentage increase amount is less than a predetermined value.

11. A control apparatus for an internal combustion engine according to claim 8, wherein the failure detection means is configured to detect a failure of the intake-valve control apparatus by causing the intake-valve control apparatus to execute maintaining control for maintaining constant the open timing of the intake valve, and making use of the degree of a change in the combustion percentage increase amount during execution of the maintaining control.

12. A control apparatus for an internal combustion engine according to claim 11, wherein the failure detection means is configured to determine that the intake-valve control apparatus has a failure when the degree of the change in the combustion percentage increase amount during execution of the maintaining control is greater than a predetermined degree.

13. A control apparatus for an internal combustion engine including an intake-valve control apparatus which controls at least open timing of an intake valve of the internal combustion engine, the engine control apparatus comprising:

combustion percentage acquisition means for acquiring a change in combustion percentage with crank angle, the combustion percentage being the ratio of an amount of combusted fuel, which increases continuously during an expansion stroke, to a total amount of fuel taken into a combustion chamber of the internal combustion engine in an intake stroke;

intake-valve control means for performing combustion-percentage-increase-amount control which causes the intake-valve control apparatus to control the open timing of the intake valve such that the combustion percentage increase amount becomes equal to an increase amount target value; and failure detection means for detecting a failure of the engine control apparatus by making use of an increase amount of the combustion percentage within a predetermined crank angle range during the expansion stroke, the increase amount changing as a result of control of the open timing of the intake valve by the intake-valve control apparatus, wherein the failure detection means is configured to determine that the engine control apparatus has a failure when the degree of a deviation of the combustion percentage increase amount from the increase amount target value is greater than a predetermined degree during the combustion-percentage-increase-amount control.

14. A control apparatus for an internal combustion engine according to claim 13, wherein the failure detection means is configured to detect the failure when the internal combustion engine is in a light load state in which the load of the internal combustion engine is lighter than a predetermined level.

15. A control apparatus for an internal combustion engine according to claim 13, further comprising ignition timing control means for performing ignition timing control which controls the timing of ignition effected by an ignition apparatus such that the combustion percentage at a predetermined crank angle during the expansion stroke coincides with a combustion percentage target value, wherein the failure detection means is configured to acquire the combustion percentage increase amount on the basis of a deviation of the combustion percentage at the predetermined crank angle during the ignition timing control from the combustion percentage target value.

16. A control apparatus for an internal combustion engine including an intake-valve control apparatus which controls at least open timing of an intake valve of the internal combustion engine, the engine control apparatus comprising:

combustion percentage acquisition means for acquiring a change in combustion percentage with crank angle, the combustion percentage being the ratio of an amount of combusted fuel, which increases continuously during an expansion stroke, to a total amount of fuel taken into a combustion chamber of the internal combustion engine in an intake stroke;

intake-valve control means for performing combustion-percentage-increase-amount control which causes the intake-valve control apparatus to control the open timing of the intake valve such that the combustion percentage increase amount becomes equal to an increase amount target value; and failure detection means for detecting a failure of the engine control apparatus by making use of an increase amount of the combustion percentage within a predetermined crank angle range during the expansion stroke, the increase amount changing as a result of control of the open timing of the intake valve by the intake-valve control apparatus, wherein the failure detection means is configured to detect a failure of the engine control apparatus by making use of a change amount between the combustion percentage increase amount before the increase amount target value is changed by a predetermined amount during the combustion-percentage-increase-amount control and that after the increase amount target value has been changed by the predetermined amount during the combustion-percentage-increase-amount control.

17. A control apparatus for an internal combustion engine according to claim 16, wherein the failure detection means is configured to determine that the engine control apparatus has a failure when the change amount of the combustion percentage increase amount is less than a predetermined value.

18. A control apparatus for an internal combustion engine according to claim 16, wherein the failure detection means is configured to detect the failure when the internal combustion engine is in a light load state in which the load of the internal combustion engine is lighter than a predetermined level.

19. A control apparatus for an internal combustion engine according to claim 16, further comprising ignition timing control means for performing ignition timing control which controls the timing of ignition effected by an ignition apparatus such that the combustion percentage at a predetermined crank angle during the expansion stroke coincides with a combustion percentage target value, wherein the failure detection means is configured to acquire the combustion percentage increase amount on the basis of a deviation of the combustion percentage at the predetermined crank angle during the ignition timing control from the combustion percentage target value.

* * * * *